United States Patent [19]
Engst et al.

[11] Patent Number: 5,487,501
[45] Date of Patent: Jan. 30, 1996

[54] SHOCK ABSORBER COMPONENT FOR RAILWAY TRACK HAVING POUROUS RUBBER PARTICLE CORE ENCLOSED BY COVER LAYER

[75] Inventors: Wilhelm Engst; Alexander Repczuk, both of Köln; Horst Weller, Bad Berleburg, all of Germany

[73] Assignee: Clouth Gummiwerke Aktiengesellschaft, Köln, Germany

[21] Appl. No.: 178,270

[22] PCT Filed: Jun. 30, 1992

[86] PCT No.: PCT/DE92/00541

§ 371 Date: Jan. 10, 1994

§ 102(e) Date: Jan. 10, 1994

[87] PCT Pub. No.: WO93/01355

PCT Pub. Date: Jan. 21, 1993

[30]  Foreign Application Priority Data

Jul. 9, 1991 [DE] Germany .......................... 41 22 682.8

[51] Int. Cl.$^6$ ..................................................... E01B 1/00
[52] U.S. Cl. ............................................................. 238/2
[58] Field of Search ......................... 238/2, 6, 7, 283; 267/75, 152; 248/634

[56]  References Cited

U.S. PATENT DOCUMENTS

| 3,756,507 | 9/1973 | Hänig et al. | 238/2 |
| 4,720,043 | 1/1988 | Ortwein | 238/2 |

FOREIGN PATENT DOCUMENTS

| 2212011 | 7/1974 | France . | |
| 2911319 | 11/1979 | Germany . | |
| 3144608 | 5/1983 | Germany | 238/2 |
| 3716834 | 11/1987 | Germany | 238/2 |

Primary Examiner—Robert J. Oberleitner
Assistant Examiner—S. Joseph Morano
Attorney, Agent, or Firm—Walter Ottesen

[57]  ABSTRACT

A shock absorber component 7 is in the form of a flatly placeable strip, plate or mat and is especially for supporting the track of railroads. The shock absorber component 7 is placed between the superstructure 2 and the roadbed 1 of the track assembly. The shock absorber component 7 includes a core layer 8 having bonded rubber particles 12 and a cover layer 10 made of flexible material. The cover layer 10 surrounds this core layer 8. The rubber particles 12 of the core layer 8 are exclusively porous and the cover layer 10 is made of a compact rubber material. The cover layer 10 is vulcanized to the core layer 8.

12 Claims, 1 Drawing Sheet

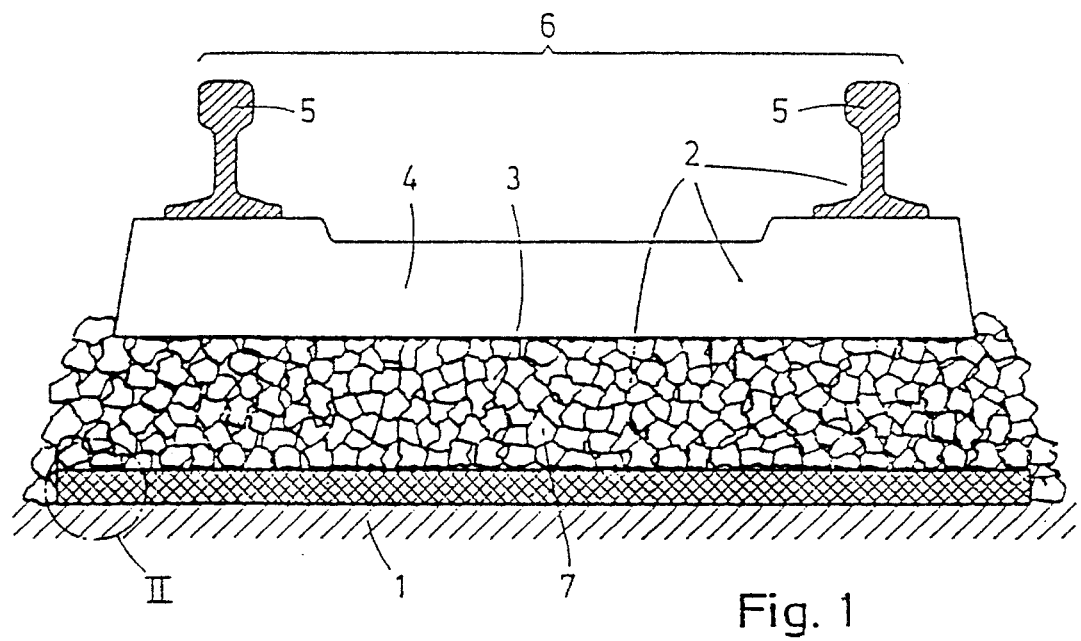
Fig. 1
Fig. 2
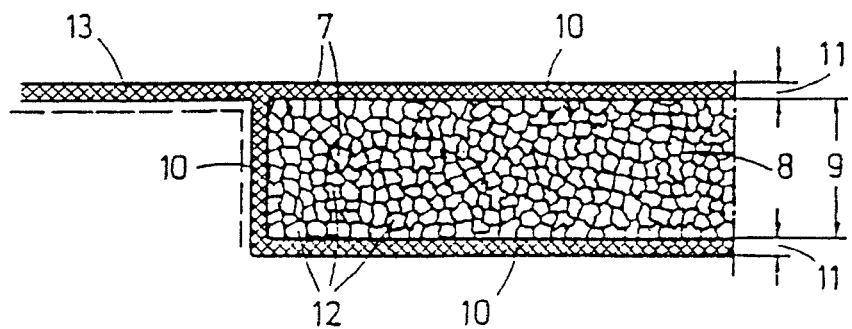

SHOCK ABSORBER COMPONENT FOR RAILWAY TRACK HAVING POUROUS RUBBER PARTICLE CORE ENCLOSED BY COVER LAYER

FIELD OF THE INVENTION

The invention relates to a shock absorber component in the form of a flatly placeable strip or plate such as (but not exclusively) for use in the support of track structures for railroads. The shock absorber component can be placed, for example, between the superstructure and the roadbed of the track. The shock absorber component comprises a core layer having bonded rubber particles and a cover layer made of flexible material.

BACKGROUND OF THE INVENTION

A shock absorber of the kind referred to above is disclosed in German patent publication 2,911,319.

This known shock absorber component made of elastomeric material is characterized in that the elastomeric material comprises a mixture of compact material held together by a binding agent. The compact material is, for example, rubber or polyurethane with particles of a porous material such as flexible plastic foam or other porous materials such as microcellular rubber pieces.

In this way, a shock absorber component is provided having shock absorber and force-reducing characteristics which are variable and the shock absorber component remains fully operational with respect to the shock-absorbing characteristics in the case of small-area loading.

Practice has shown that the known shock absorber component cannot meet the imposed requirements adequately in every respect.

The durability and service life of the known shock absorber component is influenced by the special combination of materials for the core layer because this core layer can be joined to the surrounding cover layer only by utilizing additional intermediate and binding layers. It is also, however, disadvantageous that the core layer is formed from a mixture of compact material and porous material. For this reason, the shock absorber and force-reducing characteristics can be influenced only over a range which can be determined by the possible mixture ratios of particles of compact material and particles of porous material.

SUMMARY OF THE INVENTION

It is an object of the invention to eliminate these disadvantages. The task to be solved is therefore to provide a shock absorber component of this kind which achieves a high use value and/or a longer service life while at the same time being simple to manufacture and which, furthermore, also has improved damping characteristics.

A shock absorber component according to the invention is then basically characterized in that the rubber particles of the core layer are exclusively porous and the cover layer comprises a compact rubber material as well as being vulcanized directly to the core layer.

In the shock absorber component of the invention, the rubber cover layer is vulcanized directly to the core layer while omitting intermediate and binding layers. For this reason, not only a simplified production of the shock absorber components is provided but also an optimal bond is achieved between the core layer and the cover layer. The exclusive use of porous rubber material for the core layer also makes it possible to improve the damping characteristics with respect to the shock absorber components of the state of the art.

This improvement is especially obvious in that considerably softer mat characteristics can be obtained and, above all, a uniform stroke or stiffness is provided at all locations even for a relatively slight thickness of a flat shock absorber component. At the same time, a uniform counterpressure of the core layer is obtained in this way when applying the cover layers by vulcanization and therefore a uniformly applied vulcanization is achieved.

According to the invention, the suggestion is also made that the core layer comprises at least two kinds of porous rubber particles. This can be a natural as well as also a synthetic material which exhibits different porosities and/or also different elasticities. These preconditions are then of essential significance for influencing the damping characteristics of a shock absorber component according to the invention when the rubber cover layer is vulcanized under pressure to the core layer.

According to the invention, the use of a core layer is preferred in which the size of the porous rubber particles lies in a range between 2 and 18 mm.

In some cases it has been shown to be advantageous that the rubber cover layer of the invention contains one or several reinforcement inserts made of non-woven fibers and/or fabric or that these are fixed directly to the top surface. It is likewise possible to configure the cover layers to have different thicknesses on all sides.

For the primary utilization purpose it is important also that the cover layer of the invention comprises a deterioration-resistant and/or oil-resistant rubber material.

The thickness ratios of the core layer and the cover layer can, in the context of the invention, be between 7:1 and 14:1 but preferably between 9:1 and 12:1.

According to the invention it is possible to form the core layer from cellular rubber chips, microcellular rubber chips or foam-rubber chips or to use porous rubber particles in its production which are otherwise reduced in size.

In each case, the rubber particles of the core layer can have a bond with each other produced by latexing. This is done when it is important to obtain especially good dynamic characteristics of the shock absorber component.

Furthermore, an especially advantageous embodiment provides that the cover layer extends beyond the core layer on one side so that a cover layer strip is formed which covers the abutment interface when placing several mat-shaped shock absorber components one next to the other.

The shock absorber component of the invention provides a long service life and is simple to manufacture and has good damping characteristics.

BRIEF DESCRIPTION OF THE DRAWINGS

The invention will now be described with reference to the drawings wherein:

FIG. 1 is a vertical section of a shock absorber component arranged between the superstructure and the roadbed of the track of a railroad with the shock absorber component being laid flat as a strip or plate; and, FIG. 2 shows a detail II of the shock absorber component of FIG. 1 placed flat as a strip, plate or mat.

DESCRIPTION OF THE PREFERRED EMBODIMENTS OF THE INVENTION

In FIG. 1 of the drawing, a track structure of a railroad is shown in vertical section. The superstructure 2 is supported on a roadbed 1 such as a concrete plate of a bridge or of a tunnel. The superstructure 2, in turn, comprises the ballast 3 and the ties 4 resting therein and the rails 5 of the track 6 which are carried by the ties 4.

A shock absorber component 7 is mounted between the upper surface of the roadbed 1 and the superstructure 2, namely, below the ballast 3. The shock absorber component is in the form of a flatly placed strip, plate or mat and runs parallel to the longitudinal direction of the track 6 and extends over a width which is at least equal to or preferably somewhat larger than the length of the ties 4.

Shock-like loads go into the ballast 3 from the rail 6 via the ties 4 and then into the roadbed 1. The shock absorber component 7 has the task to avoid or at least weaken the transmission of shock-like loads so that the resulting effects and damages to the roadbed 1 do not occur.

The shock absorber component 7 is shown only schematically in FIG. 1 of the drawing. According to FIG. 2, the shock absorber component 7 comprises a core layer 8 of relatively large thickness 9 and a cover layer 10 which encloses the core layer 8 on all sides. The cover layer 10 is provided only with a relatively small thickness 11 and the cover layer 10 is preferably configured at one end to overlap the abutting interface as an overlapping strip 13.

It has been shown advantageous that the thickness ratios of the core layer 8 and the cover layer 10 lie between 7:1 and 14:1 and preferably between 9:1 and 12:1.

The core layer 8 of the shock absorber component 7 is produced from bonded rubber particles 12; whereas, the cover layer 10 which surrounds the core layer 8 is made of a flexible and compact rubber material.

The rubber particles 12 of the core layer 8 are formed exclusively of porous material such as cellular rubber chips, microcellular rubber chips or foam-rubber chips which should have a size or dimension between 2 and 18 mm.

It has been proven advantageous to use two different types of porous rubber particles for forming the core layer.

To produce the core layer, a bonded rubber granulate can be used with this rubber granulate comprising foamed rubber material having different thicknesses.

Mixtures of regranulated rubber material can also be used.

The mixture of foamed rubber material can comprise different rubber types such as natural rubber and synthetic rubber. This material can also be a material which is manufactured pursuant to different production processes.

Depending upon the use conditions, attention must be given to the fact that the porous rubber particles 12 used for making the core layer 8 have favorable dynamic characteristics and that they do not perform in a stiffer manner or at least only in a slightly stiffer manner for dynamic loading than for static loading.

When the cover layer 10 made of compact rubber material is vulcanized to the core layer 8, then this should take place at least under a certain pressure so that a permanently trouble-free bond of the cover layer 10 to the core layer 8 is produced.

It is also provided that the cover layer is produced from a rubber material which is resistant to deterioration and/or resistant to oil. One or several reinforcement inserts made of non-woven fibers and/or fabric can be worked into the rubber cover layer 10 or be applied to the cover layer.

The correct selection of the porous rubber material for the core layer 8 as well as for the compact rubber material for the cover layer 10 is also of significance insofar as a trouble-free even upper surface is guaranteed on the shock absorber component. For this trouble-free even upper surface, corrugation or waffle patterns can be formed directly during production in the cover layer 10 as required. The slip-free placement of the strip-shaped, plate-shaped or mat-shaped shock absorber component 7 is thereby facilitated.

List of Reference Numerals 1 roadbed
2 superstructure
3 ballast
4 tie
5 rails
6 track
7 shock absorber component
8 core layer
9 thickness
10 cover layer
11 thickness
12 rubber particles
13 overlapping strips

I claim:

1. A shock absorber component in the form of a strip, plate, or mat which can be laid flat on a bed for supporting a superstructure, the shock absorber component comprising:

a core layer made up only of porous rubber particles bonded to each other;

a cover layer surrounding said core layer;

said cover layer being directly vulcanized to said core layer and being made of a compact rubber material;

a plurality of said components are placed one next to the other so that each two mutually adjoining components conjointly define an abutting interface; and, the cover layer of each of said components having a projection which covers the abutting interface; and, said core layer having an upper surface, a lower surface, and side surfaces; said cover layer including a top portion covering said upper surface; and, said projection being a flange extension of said top portion extending laterally beyond said core layer at one of said side surfaces.

2. The shock absorber component of claim 1, comprising in combination, said bed being a roadbed for a railroad and said superstructure including ballast placed directly on said shock absorber component and a track assembly mounted on said ballast.

3. The shock absorber component of claim 1, said core layer comprising at least two porous types of rubber particles.

4. The shock absorber component of claim 1, said cover layer being pressure vulcanized to said core layer.

5. The shock absorber component of claim 1, said porous rubber particles having a size within the range of 2 to 18 mm.

6. The shock absorber component of claim 1, said cover layer including at least one reinforcement insert made of at least one of non-woven fibers and fabric.

7. The shock absorber component of claim 1, said cover layer being made of a rubber material which is resistant to deterioration and to oil.

8. The shock absorber component of claim 1, said core layer and said cover layer having respective thicknesses defining a ratio lying in the range of 7:1 to 14:1.

9. The shock absorber component of claim 8, said ratio lying in the range of 9:1 to 12:1.

10. The shock absorber component of claim 1, said core layer being made of cellular rubber chips, microcellular rubber chips, or foam rubber chips.

11. The shock absorber component of claim 1, said core layer being made of cellular rubber granulate, microcellular rubber granulate or foam rubber granulate.

12. The shock absorber component of claim 1, said rubber particles of said core layer having a bond to each other which is produced by latexing.

* * * * *

UNITED STATES PATENT AND TRADEMARK OFFICE
CERTIFICATE OF CORRECTION

PATENT NO.   : 5,487,501

DATED        : January 30, 1996

INVENTOR(S)  : Wilhelm Engst, Alexander Repczuk and Horst Weller

It is certified that error appears in the above-identified patent and that said Letters Patent is hereby corrected as shown below:

On the title page: Item [54]    and in column 1: delete "POUROUS" and substitute -- POROUS -- therefor.

In column 3, line 15:  delete "the".

Signed and Sealed this

Twenty-third Day of July, 1996

Attest:

BRUCE LEHMAN

Attesting Officer

Commissioner of Patents and Trademarks